July 1, 1924.
S. H. BROWN
STORAGE BATTERY
Filed Aug. 28, 1922
1,499,907
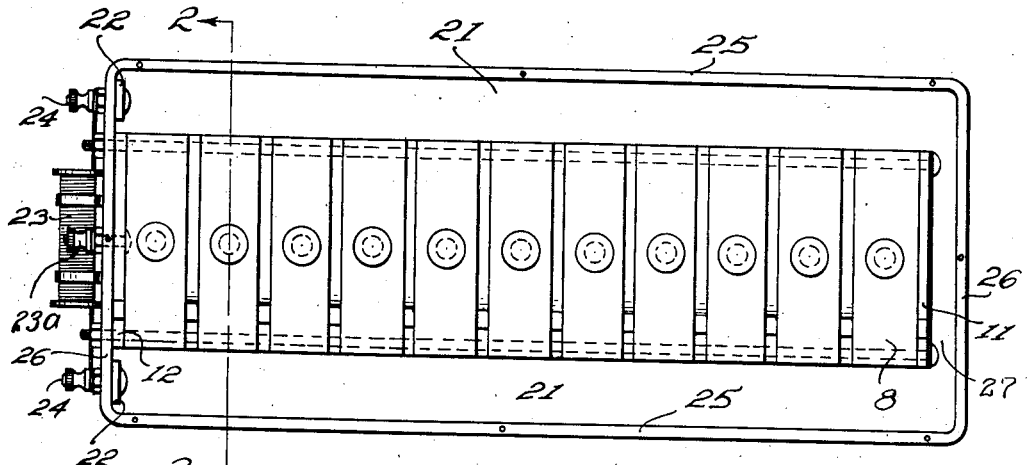
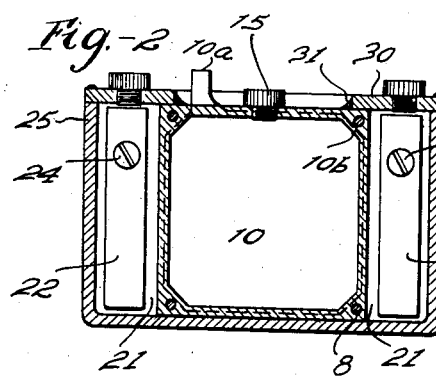
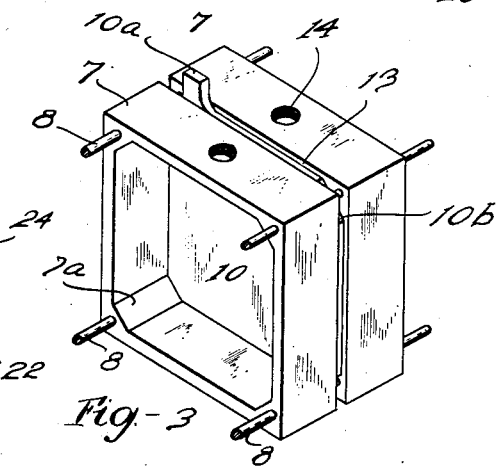
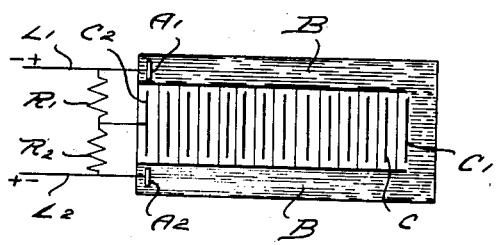
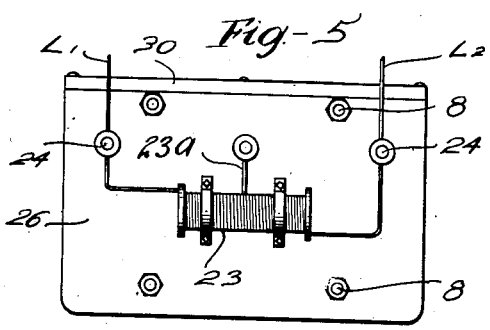
INVENTOR
Samuel H. Brown
BY Bates & Macklin
ATTYS Patented July 1, 1924.

1,499,907

UNITED STATES PATENT OFFICE.

SAMUEL H. BROWN, OF CLEVELAND, OHIO.

STORAGE BATTERY.

Application filed August 28, 1922. Serial No. 584,635.

*To all whom it may concern:*

Be it known that I, SAMUEL H. BROWN, a citizen of the United States, residing at Cleveland, in the county of Cuyahoga and State of Ohio, have invented a certain new and useful Improvement in Storage Batteries, of which the following is a full, clear, and exact description, reference being had to the accompanying drawings.

The general object of this invention is the provision of a simple, economical, efficient and durable storage battery of a construction which readily lends itself to the incorporation of novel rectifying means therewith, whereby the battery may be charged by an alternating current.

My invention provides a novel combination of jars and electrodes, whereby the electrodes may comprise plates forming the side walls of the jars, the plates being assembled in the battery in such a manner as to serve as partitioning means between the jars as well as the electrodes. The jars and plates may be in the form of a unit positioned within an outer casing of sufficient size to provide a space extending longitudinally of the jars and plates, the casing being adapted to have the space filled with an electrically conductive chemical solution which may be used in combination with rectifying coils secured to the casing and together with the coils providing rectifying means for charging the cells of the battery from a source of alternating current.

Other objects will become apparent from the description hereinafter set forth referring to the accompanying drawings, which illustrate a preferred embodiment of my invention. The essential characteristics will be summarized in the claims.

In the drawings, Fig. 1 is a plan view of my battery with the cover member removed therefrom; Fig. 2 is a cross section through the casing and one of the elements of the battery taken along the line 2—2 of Fig. 1; Fig. 3 is a perspective view illustrating the relation of adjacent jars to an electrode plate disposed therebetween and in clamped relation therewith; Fig. 4 is an end elevation of the battery showing rectifying coils attached thereto; Fig. 5 is a diagrammatic representation of the battery when ready for charging from a source of alternating current.

In carrying out the objects of my invention, I provide a series of jar elements indicated by the reference character 7, which may be formed of any suitable acid resisting material such as rubberoid with opposed ends thereof completely open as shown in Fig. 3. The elements may have reinforcing corner portions $7^a$ on the inside thereof to afford sufficient material for the forming of openings adjacent the four corners which are of such size as to receive clamping rods of a substantial cross section, whereby considerable tension may be exerted upon the rods to firmly engage the perimeters of electrodes 10 disposed therebetween. These electrodes may comprise lead plates of a substantial thickness to withstand considerable chemical reaction during the life of the battery. The lead plates may be provided with lug or terminal portions $10^a$ projecting above the top surface of the jar elements 7 to afford connecting means for each individual cell. The dimensions of the plates may be slightly less than the outside dimensions of the jar elements with the corners thereof cut away a sufficient distance to clear the clamping rods 8; the corner edges however being sufficiently close to the clamping bars to insure the clamping thereof along the edges of the corner reinforcing portions $7^a$.

Threaded openings 14 are provided in the tops of the elements 7 for the reception of removable plugs 15 whereby the compartments or cells may be filled from time to time with a suitable electrolyte such as dilute sulphuric acid. In the present embodiment, there is a closing plate 11 providing an end wall for the last jar element of the series.

As illustrated in Figs. 1 and 3, the jar elements 7 extend beyond the margins of the plates, thus providing grooves 13 completely around the walls which may be filled with pitch or other suitable sealing compound. It will be noted that by having the intermediate plates comprising the adjacent walls of the elements 7, one side of the plate will be acting as an anode and the other side acts as a cathode. In other words, when the plate walls are assembled with the jar elements, the jars become connected in series by filling the jaws with an electrolyte solution.

To charge the battery, I have provided a very simple means which may be permanently incorporated in the battery construction and which is in the nature of a rectifier whereby the battery may be charged from a source of alternating current of proper potential. I find that by providing an outer casing 20 of sufficient length and width to provide an end space 27 between one of the end walls 26 and electrode plate 11 and longitudinal spaces 21 between the jar walls and casing walls 25 and by filling these spaces with a suitable chemical solution, such as an aqueous solution of commercial borax, that the solution will act as a conductor in charging the plates 10.

To establish a connection between an alternating current line and the borax solution, anodes 22, formed of aluminum plate or other suitable material, may be secured to the end wall of the casing in contact with the borax solution. These anodes may be respectively connected to resistance coils 23 through bolts 24 extending through the end wall of the casing which may also serve to clamp the anodes thereto. The double coils 23 may have an equal number of turns which may lie interposed between a connection $23^a$ from the end plate 12 to the service wires.

This arrangement is diagrammatically illustrated in Fig. 4, wherein $A^1$ and $A^2$ represent aluminum anodes; B the borax solution; and C the lead plates or electrodes. As shown in the diagram, the borax solution is in contact with the end plate 11 represented by $C^1$, while the other end plate $C^2$ is connected in parallel with resistance coils 23, indicated by $R^1$ and $R^2$. The service wires, $L^1$ and $L^2$, are connected directly to the anodes $A^1$ and $A^2$ and to the end plate $C^2$, through the resistance $R^1$ and $R^2$.

The rectifying action is such, that current will flow from the service line $L^1$ to the anode $A^1$ through the borax solution B to the end plate $C^1$ and then successively through the plates and electrolyte in the various jars until it has traversed through the series of lead walls, to the end plate $C^2$ whence it passes through the service line $L^2$; this flow of current taking place through that part of alternation in the current which is positive. Upon the reversing of the current, the current will flow through the line $L^2$ to the anode $A^2$, borax solution B and plate $C^1$ through the series of plates or walls and electrolyte back to the end plate $C^2$, thence to the service line $L^1$. The current will thus always flow in one direction from the end plate $C^1$ through all the cells to the end plate $C^2$. It is preferable to provide means for disconnecting the aluminum anodes A from the resistance coils $R^1$ and $R^2$, when the battery is in use. Any suitable mechanism may be provided to disconnect the plate $C^2$ from the resistance coils.

If desired, the borax solution may be retained in the battery by securing a removable cover 30 to the casing to prevent the leaking and evaporation of the solution from the casing. This cover may have an elongated opening to expose the jar plugs 15, as well as the plate lugs $10^a$. The inner edges of the cover may be sealed, as indicated at 31, upon the top surfaces of the jars by any suitable acid resisting compound.

It is to be seen that my invention provides a very simple and economical battery construction wherein the elements corresponding to the jars in the usual battery, are formed by assembling a number of hollow, open ended spacing elements upon clamping rods with the electrode plates disposed between the elements and in clamped relation therewith, whereby the electrodes serve as walls for the elements. Furthermore, in my construction, one electrode functions in two adjacent jars or cells, one side of the electrode being positive while the other side is negative.

The electrodes are also provided with the usual terminal lugs whereby any desired voltage may be obtained by including one or more cells within the connection; in the present illustration the total potential being substantially equal to $22\frac{1}{2}$ volts. Furthermore, if it is desired to obtain a lower potential with a higher flow of current, the jars may be connected in parallel in the usual manner.

An unusual advantage is to be found in the manner in which I enclose the battery jars in that the casing may also comprise an additional support for the jars as well as part of the rectifying mechanism whereby the jars may be charged from an alternating current service line; the rectifier means being incorporated within the battery construction in a very economical manner; there being only the addition of rectifying coils. A distinct advantage is to be found in the present arrangement of the rectifying means even when using a source of direct current as there is no possibility of connecting the battery to the line incorrectly.

It is to be understood that my invention may be embodied in a variety of constructions. The spacing elements, for instance, may be replaced by an open top container having interiorly formed slots for the reception of the edges of the plates which may be seated and sealed therein. An appropriate cover could then be provided to seal both the inner and outer containers.

I claim:—

1. In a storage battery of the character described, the combination of a series of spaced-apart electrode plates, cavitary spacing means comprising electrolytic containers between said plates, a casing housing the set of cells, and anodes in the casing outside of the cells.

2. In a storage battery of the character described, the combination of a series of open-sided jars, electrode plates interposed between the jars and closing said openings, and clamping means compressively securing the jars and plates together to form a series of electrolytic cells, a casing housing the set of cells, and anodes disposed within the casing, whereby the electrode plates may be charged from a service line through an electrically conductive chemical solution filling the intervening spaces between the battery cells and the casing walls.

3. In a storage battery of the character described, a plurality of cells having separating electrode plates therebetween with opposed surfaces thereof exposed to the interiors of adjacent cells, a casing surrounding the cells with an intervening space on three sides of the series of cells, whereby an electrically conductive solution may be contained thereby, anodes positioned at the opposite end of the casing within said spaces and alternating current rectifying means comprising resistance coils secured to the exterior of the casing and electrically connected to the anodes, whereby a conductive path is provided between the anodes and an end plate of the series of electrodes, thus providing a direct current charging means for electrolytically forming the series of electrodes disposed between the element jars.

4. In a storage battery of the character described, the combination of a series of electrolytic jars, a series of electrode plates extending between adjacent jars, clamping means securing the jars and plates together to form a series of cells, a casing surrounding the cells with spaces extending exteriorly of the series of cells, and anodes disposed within the casing, whereby the electrode plates may be charged from a service line through an electrically conductive solution filling the said spaces between the battery cells and the casing.

5. In a storage battery of the character described, a plurality of cells formed by separating electrode plates with opposed surfaces exposed to the interior of adjacent cells, a casing surrounding the cells with an intervening space between the cells and the walls of the casing, whereby an electrically conductive solution may be contained thereby, anodes positioned within the casing, and alternating current rectifying means comprising resistance coils secured to the casing and electrically connected to the anodes, whereby a conductive path is provided between the anodes and one of the electrode plates, thereby providing a direct current charging means for electrolytically forming the series of electrode plates.

6. In a storage battery of the character described, the combination of a series of electrode plates, spacing means in the nature of open-ended jars in clamped relation with the electrode plates, whereby an electric current may flow from one jar to another independent of any other connection between the plates, there being an exteriorly disposed plate closing the open side of an end jar, a casing surrounding the jars and electrodes with an intervening space between the walls of the casing and the jars, anodes secured to the wall of the casing and disposed within said space, and rectifier resistance coils secured to the exterior of the casing adjacent the anodes, whereby a rectified current may flow from an alternating service line connected with the anodes through an electrically conductive solution in the casing to said end electrode and thereafter to each succeeding electrode through an electrolytic solution contained in the jars.

7. In a storage battery of the character described, the combination of a series of spaced apart electrode plates, spacing means in the nature of a jar engaging the perimeter of adjacent plates, whereby an electric current may flow from one plate to another when the jar is filled with an electrolytic solution, there being an exteriorly disposed plate closing the open side of the jar, a casing surrounding the jar and electrodes with an intervening space between a wall of the casing and the exteriorly disposed plate, anodes secured to a wall of the casing and disposed within said space, rectifier resistance coils secured to the exterior of the casing and connected to the anodes, whereby a rectified current may flow from an alternating service line connected with the anodes through an electrically conductive solution in said space to said exteriorly disposed plate and thereafter to an adjacent electrode through an electrolytic solution contained by the jar.

8. In a storage battery of the class described, the combination of an inner and an outer container, said inner container comprising a plurality of cells formed by a series of spaced apart plates adaptable for use as electrodes, said outer container being in the form of a casing surrounding the inner container with intervening spaces between the walls of the outer container and the walls of the inner container, electrodes disposed within the spaces between the walls of the respective containers arranged to be connected to the wires of an alternating current service line, and rectifying means associated with said last named electrodes, whereby the electrode plates in the inner container may be formed by a rectified direct current passing through an electrically conductive solution placed in said intervening spaces.

9. In a storage battery of the character described, the combination of an inner and an outer container, a plurality of electrode plates dividing the inner container into a series of compartments adaptable for the containing of an electrolytic solution, another electrode closing an exposed end of the inner container, the breadth and width dimensions of the outer container being substantially greater than those of the inner container to provide spaces between the walls of the inner container and the outer container adaptable for the reception of an electrically conductive chemical solution, electrodes serving as anodes disposed within said spaces and arranged to be connected to an alternating current service line, and alternating current rectifying means associated with said anodes, whereby the electrode plates dividing the inner container into electrolyte compartments may be formed by a rectified direct current passing through said electrically conductive chemical solution.

10. In a storage battery of the class described, the combination of an inner and an outer container, said inner container being divided into a plurality of electrolytic cells formed by a series of spaced apart plates adaptable for use as electrodes, said outer container being sufficiently larger than the inner container to provide spaces between the walls of the respective containers, aluminum electrodes disposed in said spaces and arranged to be connected to the wires of an alternating current service line, rectifying means associated with the last named electrodes, whereby the electrode plates in the inner container may be formed by a rectified direct current passing through an electrically conductive solution placed in said intervening spaces from the aluminum electrodes to said plates.

In testimony whereof, I hereunto affix my signature.

SAMUEL H. BROWN.